United States Patent
Van Niekerk et al.

(10) Patent No.: US 10,427,243 B2
(45) Date of Patent: Oct. 1, 2019

(54) METHOD FOR PRODUCING A LASER WELD SEAM BETWEEN COMPONENTS BY USE OF A SPHERICAL OR SPHERE-LIKE ELEMENT, AND CORRESPONDING COMPONENT CONNECTION

(71) Applicant: Bayerische Motoren Werke Aktiengesellschaft, Munich (DE)

(72) Inventors: Johann Van Niekerk, Munich (DE); Hans Langrieger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 477 days.

(21) Appl. No.: 15/187,881

(22) Filed: Jun. 21, 2016

(65) Prior Publication Data

US 2016/0297031 A1    Oct. 13, 2016

Related U.S. Application Data

(63) Continuation of application No. PCT/EP2015/051078, filed on Jan. 21, 2015.

(30) Foreign Application Priority Data

Feb. 13, 2014    (DE) .................. 10 2014 202 636

(51) Int. Cl.
*B23K 26/03* (2006.01)
*B23K 26/26* (2014.01)
(Continued)

(52) U.S. Cl.
CPC ............ *B23K 26/032* (2013.01); *B23K 26/04* (2013.01); *B23K 26/242* (2015.10); *B23K 26/26* (2013.01);
(Continued)

(58) Field of Classification Search
CPC .... B23K 26/032; B23K 26/242; B23K 26/04; B23K 2101/006; B23K 2201/006
(Continued)

(56) References Cited

U.S. PATENT DOCUMENTS 5,764,366 A * 6/1998 Nguyen ............... H01L 21/681
356/401
6,670,574 B1    12/2003 Bates et al.
(Continued)

FOREIGN PATENT DOCUMENTS

CN    1476951 A    2/2004
CN    101075438 A    11/2007
(Continued)

OTHER PUBLICATIONS

German-language Office Action issued in counterpart European Patent Application No. 15 700 872.3 dated Oct. 10, 2017 (Five (5) pages).
(Continued)

*Primary Examiner* — Thien S Tran
(74) *Attorney, Agent, or Firm* — Crowell & Moring LLP

(57) ABSTRACT

A method is provided for producing a weld seam on or at a first component, or in the region of a first component, from which at least one spherical or sphere-like element projects. The position of the at least one spherical or sphere-like element is detected using an optoelectronic detection device and corresponding position data are generated. The weld seam is produced contact free using an electronically-controlled laser welding device that is arranged at a distance from the first component and said at least one spherical or sphere-like element. The laser welding device is controlled on the basis of, or using, the position data of the spherical or sphere-like element.

14 Claims, 2 Drawing Sheets

(51) Int. Cl.
- *F16B 5/08* (2006.01)
- *B23K 26/242* (2014.01)
- *B23K 26/04* (2014.01)
- *B23K 101/00* (2006.01)
- *F16B 5/06* (2006.01)
- *B23K 101/18* (2006.01)

(52) U.S. Cl.
CPC .......... *F16B 5/08* (2013.01); *B23K 2101/006* (2018.08); *B23K 2201/18* (2013.01); *F16B 5/0642* (2013.01); *F16B 5/0657* (2013.01)

(58) Field of Classification Search
USPC ............ 219/121.12, 121.64, 130.01, 130.21
See application file for complete search history.

(56) References Cited

U.S. PATENT DOCUMENTS

| | | | | |
|---|---|---|---|---|
| 2004/0052574 | A1* | 3/2004 | Grubb | B23K 26/28 403/270 |
| 2004/0192155 | A1* | 9/2004 | Taniguchi | H01T 21/02 445/70 |
| 2006/0132801 | A1* | 6/2006 | Yonescu | G01B 11/0608 356/602 |
| 2013/0212858 | A1* | 8/2013 | Herzinger | F16B 5/0642 29/428 |
| 2014/0201959 | A1 | 7/2014 | Van Niekerk et al. | |
| 2015/0033532 | A1 | 2/2015 | Van Niekerk et al. | |

FOREIGN PATENT DOCUMENTS

| | | | |
|---|---|---|---|
| CN | 103317241 A | 9/2013 | |
| DE | 1 094 989 | 12/1960 | |
| DE | 10 2010 028 322 A1 | 11/2011 | |
| DE | 10 2010 041 356 A1 | 3/2012 | |
| DE | 10 2011 079 483 A1 | 1/2013 | |
| EP | 0 437 226 A2 | 7/1991 | |
| JP | 2004-216418 A | 8/2004 | |
| JP | 2005-111538 A | 4/2005 | |
| JP | 2007-310968 A | 11/2007 | |
| JP | 2009-233753 A | 10/2009 | |
| WO | WO 2012038012 A2 * | 3/2012 | ............ F16B 5/0642 |
| WO | WO 2013/159982 A1 | 10/2013 | |

OTHER PUBLICATIONS

Chinese Office Action issued in counterpart Chinese Application No. 201580003099.3 dated Dec. 19, 2016 with English-language translation (thirteen (13) pages).

International Search Report (PCT/ISA/210) issued in PCT Application No. PCT/EP2015/051078 dated Jun. 30, 2015, with English translation (four (4) pages).

German Office Action issued in counterpart German Application No. 10 2014 202 636.9 dated Sep. 1, 2014 (five (5) pages).

* cited by examiner

METHOD FOR PRODUCING A LASER WELD SEAM BETWEEN COMPONENTS BY USE OF A SPHERICAL OR SPHERE-LIKE ELEMENT, AND CORRESPONDING COMPONENT CONNECTION

CROSS REFERENCE TO RELATED APPLICATIONS

This application is a continuation of PCT International Application No. PCT/EP2015/051078, filed Jan. 21, 2015, which claims priority under 35 U.S.C. § 119 from German Patent Application No. 10 2014 202 636.9, filed Feb. 13, 2014, the entire disclosures of which are herein expressly incorporated by reference.

This application contains subject matter related to U.S. application Ser. No. 15/187,883, entitled "Method for Producing a Component Connection and Component Connection Produced According to The Method" filed on Jun. 21, 2016.

BACKGROUND AND SUMMARY OF THE INVENTION

The present invention relates to a method for producing a seam weld on or at a first component or in the region of a first component, from which at least one spherical or sphere-like element projects, and a component connection produced according to this method.

DE 10 2010 028 322 A1 discloses a method for connecting a first vehicle component to a second vehicle component. In this case, the two vehicle components are initially put together. To this end, a sphere is attached to one of the two vehicle components, which sphere is placed in a clamping manner into a hole provided in the other vehicle component. The two vehicle components are welded after they were put together. "Sphere connections", as are described in the aforementioned DE 10 2010 028 322 A1, open up multi-faceted application options for pre-fixing and connecting components.

It is an object of the invention to provide a method by which further properties of spherical or sphere-like elements can be used in an advantageous manner.

This and other objects are achieved by a method for producing a weld seam on or at a first component or in the region of a first component, from which at least one spherical or sphere-like element projects. The position of the at least one spherical or sphere-like element is detected by an optoelectronic detection apparatus and corresponding position data are produced, and the weld seam is produced in a contactless manner by an electronically controlled laser welding device arranged at a distance from the first component and the at least one spherical or sphere-like element. The laser welding device is controlled on the basis of, or using, the position data of the spherical or sphere-like element.

A starting point of the invention is a method for generating a seam weld on or at a first component or in the region of a first component, from which at least one spherical or sphere-like element projects. By way of example, the spherical element can be an "individual sphere", which is directly arranged (e.g. welded) on an upper side of the first component or which is connected to the first component by way of a connection element. As an alternative to an element which is formed by a single spherical or sphere-like element or which only has a single spherical or sphere-like element, an element having a plurality of spherical or sphere-like elements can also project from the first component. By way of example, an element having two spherical elements which, for example, can be connected directly to one another or connected by way of a spacer element (like in the shape of a dumbbell) could project from the first component. In summary, it is noted that the invention is not restricted to a specific spherical or sphere-like element. What is essential is that an element which has at least one spherical or sphere-like element, or which is formed thereby, projects from the first component.

When a light ray is incident on the surface of a spherical element, "angle of incidence equals angle of reflection" applies very generally. A light ray which is incident perpendicular to a surface point of the spherical or sphere-like element is reflected "onto itself", which is referred to as "total reflection" below. If a light ray is "totally reflected", the reflected light ray propagates on the same "trajectory" as the initial light ray.

These properties of spherical or sphere-like elements render it possible to use a spherical or sphere-like element very easily as a (position) marker for further manufacturing steps, in particular for setting the position of a weld seam on or at the first component or in the region of the first component.

In accordance with the invention, the position of the at least one spherical or sphere-like element is detected by way of an optoelectronic detection apparatus and corresponding position data are produced.

Subsequently, the weld seam is produced on or at the first component or in the region of the first component in a contactless manner by an electronically controlled laser welding device arranged at a distance from the first component and the at least one spherical or sphere-like element. The welding device is controlled (in terms of position) according to the invention on the basis of, or using, the position data of the spherical or sphere-like element. The weld seam (weld figure) to be produced is therefore produced relative to the position of the spherical or sphere-like element. By way of example, provision can be made for the weld seam to be produced in accordance with an annulus, with the spherical or sphere-like element being situated in the center of the annulus. Naturally, "weld figures" with any other design are also contemplated.

According to one development of the invention, the optoelectronic detection apparatus has a light source (e.g. a laser light source), a sensor apparatus and an optical unit. Light rays produced by the light source are projected by way of the optical unit, which may include a mirror and/or lens arrangement, onto the surface of the at least one spherical or sphere-like element. The light rays incident on the surface of the spherical or sphere-like element are reflected there. At least some of the reflected light rays are guided to the sensor apparatus by way of the optical unit.

According to one further development of the invention, a (laser) light ray is produced by the detection apparatus. The light ray is projected perpendicularly onto a surface point of the at least one spherical or sphere-like element, is totally reflected there and is guided to the sensor apparatus by way of the optical unit.

In accordance with the invention, a whole light beam is produced by means of the detection apparatus. A detection is carried out by the sensor apparatus and evaluation electronics as to which light ray of the light beam is totally reflected at the surface of the spherical or sphere-like element.

The sensor apparatus can have a sensor array (sensor field) formed by a plurality of individual sensors. The profile of the totally reflected light ray can be established by way of an individual sensor of the sensor field detecting the totally reflected light ray. In accordance with the invention, position data of the at least one spherical or sphere-like element are derived from the profile, in particular from the directional vector of the totally reflected light ray at the surface of the spherical or sphere-like element.

What can be derived from the directional vector of the totally reflected light ray is that, to the extent that the element is a real sphere, the center of the spherical element must lie on "the extension" of the totally reflected light beam.

The position of the at least one spherical or sphere-like element, in particular the position of the center of the spherical or sphere-like element and/or a contact point of the spherical or sphere-like element on the first component, can be established from the profile of the totally reflected light beam or the vector components of the totally reflected light beam and a predetermined diameter, or a diameter measured by way of a measurement or detection apparatus, of the at least one spherical or sphere-like element.

According to one aspect of the invention, a second component having a through-hole is provided. The second component is placed onto the first component in such a way that the at least one spherical or sphere-like element projecting from the first component protrudes through the through-hole and projects out of the second component on the side of the second component facing away from the first component.

According to one development of the invention, the two components are welded to one another by way of the weld seam. Furthermore, provision can be made for the weld seam to be produced directly in the region of the spherical or sphere-like element. Therefore, the two components can be securely connected in a permanent cohesive manner to one another, directly by way of the weld seam and/or indirectly via the spherical or sphere-like element.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
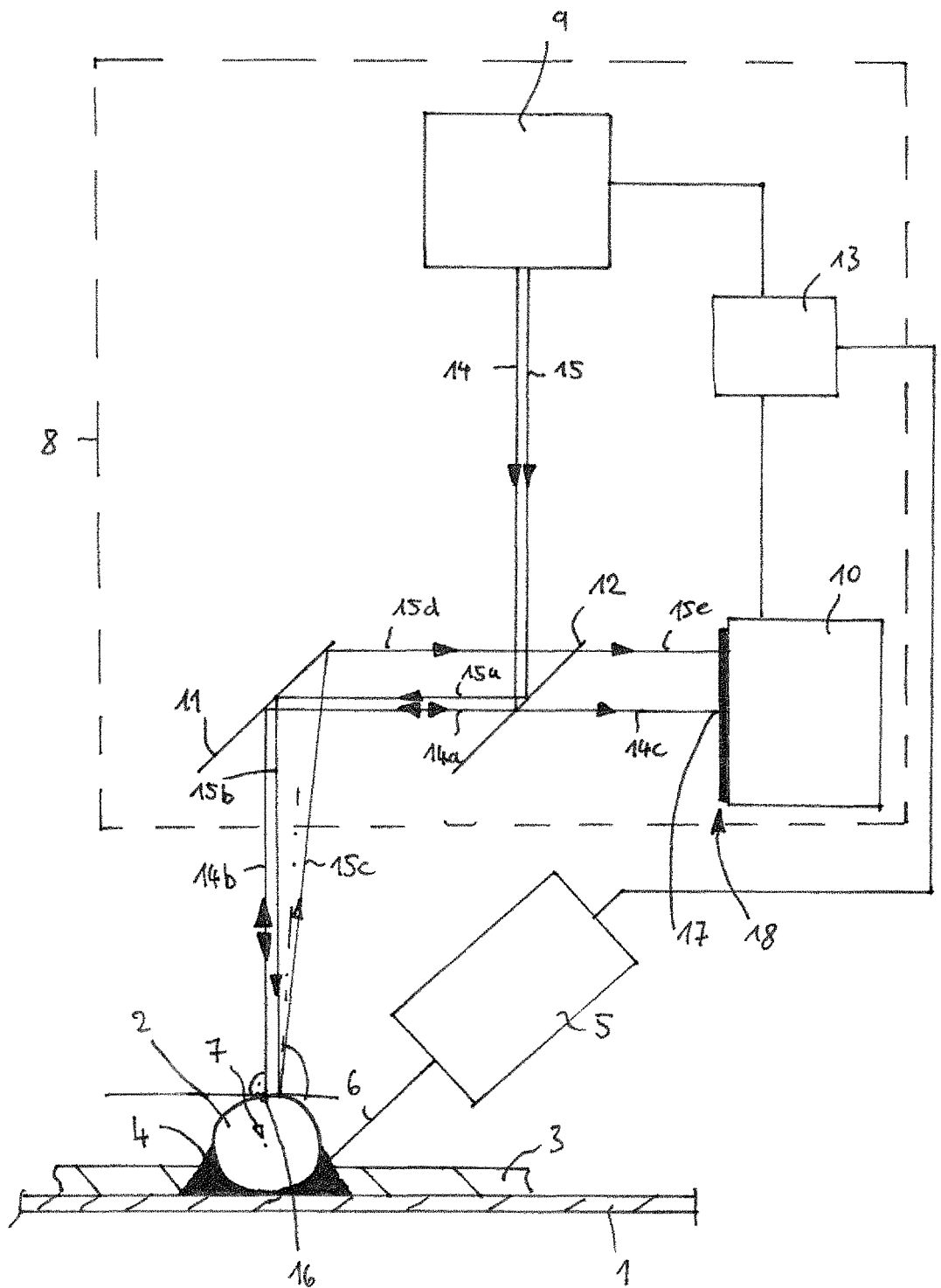
FIG. 1 is a schematic diagram illustrating an exemplary embodiment in accordance with the invention.

FIG. 1 shows a first component 1 formed by a sheet (e.g. sheet steel or sheet aluminum), from the surface of which a sphere 2 projects. By way of example, the sphere 2 can be a steel sphere or an aluminum sphere. By way of example, the sphere 2 can be connected to the sheet 1 by spot welding or in any other way.

A second component 3, which is likewise formed by a sheet in this case, is placed onto the sheet 1. The second component 3 has a through-hole with dimensions at least large enough so that the second sheet 3 can be placed, for example in a clamping manner, onto the sphere 2 with the through-hole of the second sheet. In the illustration shown in FIG. 1, the through-hole can no longer be identified as the two components 1, 3 are welded to one another via the sphere 2 or a seam weld 4 surrounding the sphere 2 in a ring-shaped manner, which no longer renders it possible to identify the through-hole.

The weld seam 4 was produced in a contactless manner by use of an electronically controlled laser welding device 5 arranged at a distance from the first component 1 and the spherical element 2. The laser welding device 5 produces a laser beam 6, which melts material of the first component 1, the second component 3 and/or the sphere 2, as a result of which the two components 1, 3 and the sphere 2 are welded to one another.

The laser welding device can be "guided around" the sphere 2 in an electronically controlled manner, for example by use of a welding robot, in order to generate a weld seam surrounding the sphere 2 in a ring-shaped manner. The laser welding device 5 or the robot (not shown here) receiving or holding the laser welding device is controlled on the basis of, or using, the position data of the spherical or sphere-like element 2, e.g. on the basis of, or using, the position of the center 7 of the sphere 2 in space and/or relative to the first and/or second component 1 and 3, respectively.

The position data of the sphere 2 are detected by use of an optoelectronic detection apparatus 8. The optoelectronic detection apparatus 8 has a laser light source 9, a sensor apparatus 10 and an optical unit which, in this case, is formed by a first mirror 11 and a semitransparent mirror 12 that reflects on one side.

The laser light source 9 and the sensor apparatus 10 are electrically connected to evaluation electronics 13, which produce the position data. The laser apparatus 5 which, as already explained above, controls the laser welding device 5 on the basis of, or using, the position data of the spherical or sphere-like element 2 is likewise connected to the evaluation electronics.

The laser light source 9 generates light rays 14, 15. Provision can also be made for the laser light source 9 to produce a whole beam, i.e. a plurality of light rays, in particular of parallel light rays.

Below, the invention is explained in more detail in conjunction with only the two light rays 14, 15.

As can be seen from the beam path, the light ray 14 is reflected at the mirror 12. The reflected light beam 14a is reflected again at the mirror 11 and it is incident perpendicularly on a surface point 16 of the sphere 2 as a light ray 14b. At the surface point 16, the light ray 14b is totally reflected, i.e. the reflected light beam 16 is identical in terms of the directional vector thereof to the light ray 14b coming from the mirror 11. The reflected light ray 14b is reflected back at the mirror 11. At least part of the back-reflected light ray 14a passes through the mirror 12 and it is incident as light ray 14c on an individual sensor 17 of a sensor field 18 of the sensor apparatus 10. The evaluation electronics 13 are used to establish that the back-reflected light ray 14c must be a totally reflected light ray. From this, it is possible to derive that the center 7 of the sphere 2 must lie on an "extension" of the light ray 14b. If the diameter of the sphere 2 is known or if the diameter of the sphere 2 is predetermined, the position of the center 7 of the sphere 2 can be established from the position data of the surface point 16, the direction vector of the light ray 14b and the diameter of the sphere 2.

It is easy to see that precisely one light ray, namely the light ray 14, 14a, 14b, 14c, of a beam of parallel light rays produced by the laser light source 9 is totally reflected.

By way of example, if the parallel light ray 15 propagating with only a small lateral offset to the light ray 14 is considered and the beam path 15a, 15b, 15c, 15d, 15e thereof is traced, it is clear that it is precisely not totally reflected. Rather, in accordance with the laws of optics (angle of incidence equals angle of reflection), it is the case that the light beam 15d is reflected back as light ray 15c.

In principle, it would also be possible to establish the position data of the sphere 2 from the spacing between the light rays 15a and 15d and the directional vector of the angle bisector between the light rays 15b, 15c. However, position data can be produced particularly easily if, to this end, use is made of the totally reflected light ray 14, 14a, 14b, 14c.

Figure 2:
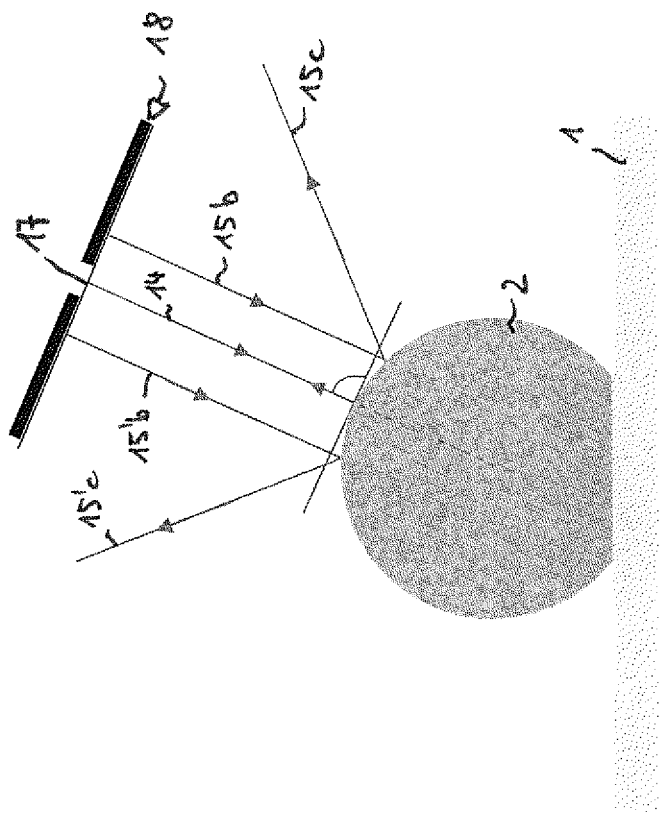
FIG. 2 is a diagram illustrating a further exemplary embodiment in accordance with the invention.

In the exemplary embodiment shown in FIG. 2, a beam of light rays 14, 15b and 15'b is projected onto the sphere 2. Of these light rays, the light ray 14 is totally reflected. The totally reflected light ray 14 illuminates a "punctiform region" (individual sensor 17) of the sensor field 18. In accordance with the "angle of incidence equals angle of reflection" principle, the other light rays 15b and 15'b of the beam of light rays 14, 15b and 15'b are reflected past the sensor field 18 from the sphere 2, i.e. they are not even incident on the sensor field 18.

Figure 3:
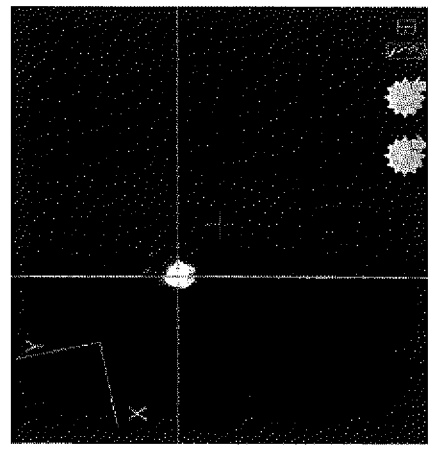
FIG. 3 illustrates the principle of detecting the totally reflected light beam.

As depicted in FIG. 3, it is therefore only necessary to search for "the illuminated punctiform region" or the "bright spot" or, more precisely, the center point or center of the brightest spot in the sensor field 18 in order to be able to identify which light ray (light ray 14) of a beam of light rays 14, 15b and 15'b is totally reflected. By searching for the center (the position of the crosshairs in FIG. 3) of the brightest spot on the sensor field 18, it is possible to establish the beam path of the totally reflected light ray 14 very precisely. Trials have shown that a "region of great brightness" (bright spot or the position of the individual sensor 17), which can be detected very precisely by optoelectronic devices, is formed quite specifically on the sensor field 18 due to the special reflection properties of a sphere when a sphere 2 is illuminated by a beam of parallel light rays 14, 15b and 15'b.

From the beam path of the totally reflected light ray 14, it is possible, in turn, to establish the position data of the sphere 2, which are included in the open-loop and/or closed-loop control of the welding device.

Therefore, the open-loop and/or closed-loop control is performed on the basis of the "grayscale image recording" formed by the sensor field 18, which has precisely one punctiform region of highest brightness and otherwise substantially unexposed regions. This is possible with a low open-loop and/or closed-loop control outlay.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a weld seam on or at a first component or in a region of the first component, at least one spherical element projecting from the first component, the method comprising the acts of:
    detecting, via an optoelectronic detection apparatus, a position of the at least one spherical element;
    producing position data corresponding to the position of the at least one spherical element after a second component to be welded to the first component is placed on the first component; and
    producing a weld seam in a contactless manner via an electronically controlled laser welding device, the laser welding device being arranged at a distance from the first component and the at least one spherical element and being controlled based on, or using, the position data of the spherical element,
    wherein the optoelectronic detection apparatus comprises a light source, a sensor apparatus, and an optical unit, the method detecting the position of the at least one spherical element further comprises the act of:
    projecting light rays produced by the light source via the optical unit onto a surface of the at least one spherical element, wherein the projected light rays are reflected there and guided to the sensor apparatus via the optical unit.

2. The method according to claim 1, wherein the act of detecting the position of the at least one spherical element further comprises the act of:
    projecting a light ray produced by the optoelectronic detection apparatus perpendicularly onto a surface point of the at least one spherical element, the projected light ray being totally reflected at the surface point and being guided to the sensor apparatus via an optical unit.

3. The method according to claim 1, wherein a light beam is produced via the optoelectronic detection apparatus and the detection of the position of the at least one spherical element is carried out via a sensor apparatus and evaluation electronics as a function of which light ray of the light beam is reflected onto itself via the at least one spherical element.

4. The method according to claim 1, wherein the sensor apparatus comprises a sensor field formed of a plurality of individual sensors, and
    wherein a light ray totally reflected by the at least one spherical element is identified by virtue of a position of a brightest region or spot detected in the sensor field.

5. The method according to claim 3, wherein a vector profile of the light ray reflected onto itself is established via an individual sensor detecting the light ray reflected onto itself.

6. The method according to claim 5, wherein the position data of the at least one spherical element is derived or produced from the vector profile of the light ray reflected onto itself.

7. The method according to claim 6, wherein the position of the at least one spherical element is detected from the vector profile of the light ray reflected onto itself and a predetermined or measured diameter of the at least one spherical element.

8. The method according to claim 5, wherein the position of the at least one spherical element is detected from the vector profile of the light ray reflected onto itself and a predetermined or measured diameter of the at least one spherical element.

9. The method according to claim 1, wherein the second component has a through-hole, the second component being placed onto the first component such that the at least one spherical element projecting from the first component protrudes through the through-hole and projects out of the second component on a side of the second component facing away from the first component.

10. The method according to claim 9, wherein the act of producing the weld seam welds the first and second components to one another.

11. The method according to claim 1, wherein the weld seam is produced directly in the region of the spherical element.

12. The method according to claim 1, wherein the weld seam is produced such that the weld seam encloses the spherical element in a ring manner.

13. A component connection connecting first and second components, the component connection being produced according to claim 1.

14. A method for producing a weld seam on or at a first component or in a region of the first component, at least one spherical element projecting from the first component, the method comprising the acts of:
   detecting, via an optoelectronic detection apparatus, a position of the at least one spherical element;
   producing position data corresponding to the position of the at least one spherical element after a second component to be welded to the first component is placed on the first component; and
   producing a weld seam in a contactless manner via an electronically controlled laser welding device, the laser welding device being arranged at a distance from the first component and the at least one spherical element and being controlled based on, or using, the position data of the spherical element,
   wherein the act of detecting the position of the at least one spherical element further comprises the act of:
   projecting a light ray produced by the optoelectronic detection apparatus perpendicularly onto a surface point of the at least one spherical element, the projected light ray being totally reflected at the surface point and being guided to the sensor apparatus via an optical unit.

* * * * *